(12) United States Patent
Lu et al.

(10) Patent No.: US 11,477,875 B1
(45) Date of Patent: Oct. 18, 2022

(54) LIGHTING SYSTEM HAVING MULTIPLE LIGHT SOURCES AND CONTROL METHOD THEREOF

(71) Applicant: Xiamen PVTECH Co., Ltd., Fujian (CN)

(72) Inventors: Fuxing Lu, Fujian (CN); Rongtu Liu, Fujian (CN); Hao Ye, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 17/542,508

(22) Filed: Dec. 6, 2021

(30) Foreign Application Priority Data

Sep. 28, 2021 (CN) .......................... 202111141895.7

(51) Int. Cl.
*H05B 47/10* (2020.01)
*H05B 47/20* (2020.01)

(52) U.S. Cl.
CPC .................. *H05B 47/20* (2020.01)

(58) Field of Classification Search
CPC ...... H05B 47/00; H05B 47/10; H05B 47/105; H05B 47/20; H05B 47/155; H05B 45/00; H05B 45/40
See application file for complete search history.

(56) References Cited

U.S. PATENT DOCUMENTS

| | | | | |
|---|---|---|---|---|
| 9,974,128 B2* | 5/2018 | Ohta | ...................... | B60Q 1/382 |
| 10,455,661 B2* | 10/2019 | Harada | .................. | H05B 45/20 |
| 10,827,593 B1* | 11/2020 | Lai | ......................... | H05B 45/20 |
| 11,064,597 B1* | 7/2021 | Zaveruha | ............... | H05B 47/17 |
| 2007/0114852 A1* | 5/2007 | Lin | ........................... | H02J 1/10 |
| | | | | 307/66 |
| 2008/0122366 A1* | 5/2008 | Cheng | ................. | H05B 41/282 |
| | | | | 315/88 |

* cited by examiner

*Primary Examiner* — Thai Pham
(74) *Attorney, Agent, or Firm* — Winston Hsu (57) ABSTRACT

A lighting system having multiple light sources is provided, which includes a first light source and a second light source. The first light source includes a first control module, a second memory module, a first lighting-emitting module and a first detection module. The second light source includes a second control module. When the first light source and the second light source are electrically connected to a power source, the first control module and the second control module turn off the first light source and the second light source respectively. The first control module reads the data of the first memory module of the first light source to determine whether the first light source malfunctions, and turns on the first light-emitting module when the first control module determines that the first light source does not malfunction. Then, the first detection module keeps detecting whether the first light source malfunctions.

10 Claims, 6 Drawing Sheets

LIGHTING SYSTEM HAVING MULTIPLE LIGHT SOURCES AND CONTROL METHOD THEREOF

BACKGROUND OF THE INVENTION

1. Field of the Invention

The present invention relates to a lighting system, in particular to a lighting system having multiple light sources. The present invention further relates to the control method of the lighting system.

2. Description of the Prior Art

With advance of technology, the functions of lighting devices become more and more powerful, which makes people's life convenient. Light-emitting diode (LED) lighting devices have many advantages, such as energy-saving, small size, high efficiency, etc. Thus, LED lighting devices have become the development trend in the future. However, currently available lighting devices have no a proper control mechanism. Therefore, once any one of the lighting devices of a lighting system malfunctions, the user should immediately replace this light device, which is very inconvenient in use.

SUMMARY OF THE INVENTION

The present invention is related to a lighting system having multiple light sources. In one embodiment of the present invention, the lighting system includes a first light source and a second light source. The first light source includes a first control module, a second memory module, a first lighting-emitting module and a first detection module. The second light source includes a second control module. When the first light source and the second light source are electrically connected to a power source, the first control module and the second control module turn off the first light source and the second light source respectively. Then, the first control module reads a data of the first memory module of the first light source in order to determine whether the first light source malfunctions, and turns on the first light-emitting module when the first control module determines that the first light source does not malfunction. The first detection module keeps detecting whether the first light source malfunctions after the first light-emitting module is turned on.

In one embodiment, the second light source further includes a second light-emitting module. When the first control module determines that the first light source malfunctions, the first control module transmits a turn-on signal to the second control module, such that the second control module turns on the second light-emitting module.

In one embodiment, the second light source further includes a second memory module and a second light-emitting module. When the first detection module detects that the first light source malfunctions, the first control module turns off the first light source, and transmits a first fault signal to the second control module and saves the first fault signal in the first memory module. When the second control module receives the first fault signal, the second control module turns on the second light-emitting module and saves the first fault signal in the second memory module.

In one embodiment, the second light source further includes a second detection module. The second detection module keeps detecting whether the second light source malfunctions after the second light-emitting module is turned on. When the second detection module detects that the second light source malfunctions, the second control module turns off the second light source and saves a second fault signal in the second memory.

In one embodiment, the second light source further includes a second light-emitting module. When the second control module detects that the first light source malfunctions and fails to receive a first fault signal transmitted by the first control module within a predetermined time period, the second control module turns on the second light-emitting module.

The present invention is further related to a control method for a lighting system having multiple light sources. In one embodiment of the present invention, the control method includes the following steps: turning off a first light source and a second light source by the first control module of a first light source and the second control module of a second light source respectively when the first light source and the second light source are electrically connected to a power source; reading the data of the first memory module of the first light source by the first control module in order to determine whether the first light source malfunctions; turning on the first light-emitting module of the first light source by the first control module when the first control module determines that the first light source does not malfunction; and keeping detecting whether the first light source malfunctions by the first detection module of the first light source.

In one embodiment, the step of reading the data of the first memory module of the first light source by the first control module in order to determine whether the first light source malfunctions further includes the following step: transmitting a turn-on signal to the second control module by the first control module and turning on the second light-emitting module of the second light source by the second control module when the first control module determines that the first light source malfunctions.

In one embodiment, the control method further includes the following steps: turning off the first light source, transmitting a first fault signal to the second control module and saving the first fault signal in the first memory module by the first control module when the first detection module detects that the first light source malfunctions; and turning on the second light-emitting module of the second light source and saving the first fault signal in the second memory module of the second light source by the second control module when the second control module receives the first fault signal.

In one embodiment, the control method further includes the following step: keeping detecting whether the second light source malfunctions by the second detection module of the second light source; and turning off the second light source and saving a second fault signal in the second memory module by the second control module when the second detection module detects that the second light source malfunctions.

In one embodiment, the control method further includes the following step: turning on the second light-emitting module of the second light source by the second control module when the second control module detects that the first light source malfunctions and fails to receive a first fault signal transmitted by the first control module within a predetermined time period.

To sum up, the lighting system having multiple light sources and the control method thereof in accordance with the present invention may include the following advantages:

(1) In one embodiment of the present invention, the lighting system having multiple light sources includes a first light source and a second light source; the first light source can serve as a main light source and the second light source can serve as a spare light source. Thus, the lighting system having multiple light sources can turn on the second light source when the first light source malfunctions, such that the lighting system can operate normally even if the first light source malfunctions, which is more convenient in use.

(2) In one embodiment of the present invention, the first light source and the second light source of the lighting system having multiple light sources can communicate with each other, and the lighting system can further provide a special switching mechanism and a special detection mechanism. Therefore, the lighting system can precisely detect whether the first light source malfunctions and turn on the second light source on time. Accordingly, the lighting system can achieve great reliability.

(3) In one embodiment of the present invention, the lighting system having multiple light sources can directly turn on the second light source via a special activation mechanism when the first light source malfunctions and cannot transmit signals. Thus, the lighting system can make sure that the second light source can be normally turned on when the first light source malfunctions, which can further enhance the reliability of the lighting system.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 1:
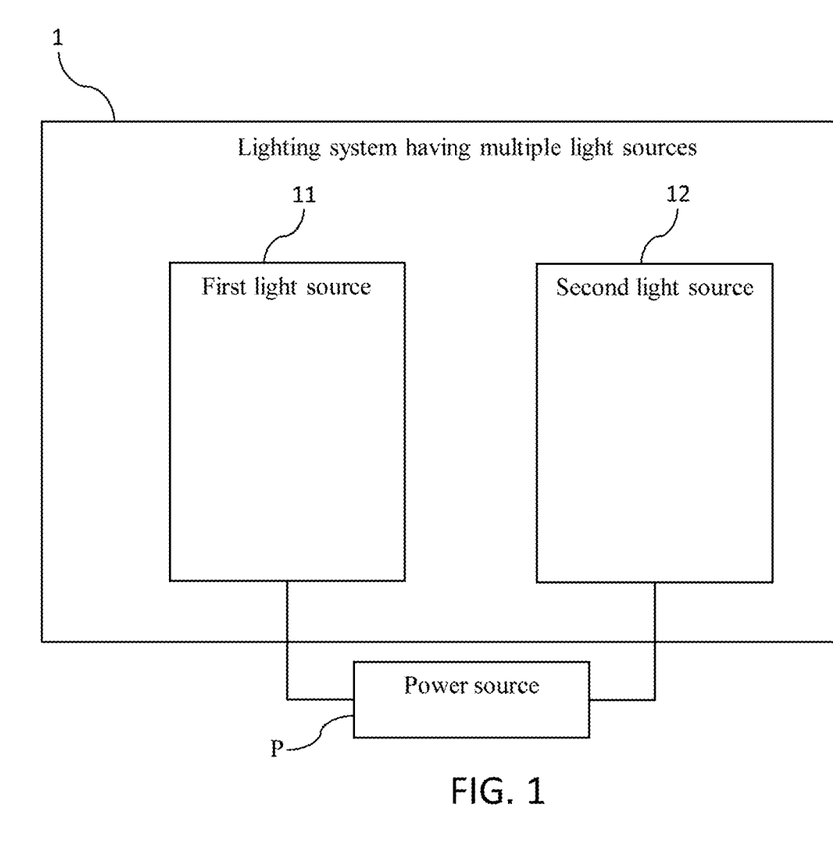
FIG. 1 is a block diagram of a lighting system having multiple light sources in accordance with one embodiment of the present invention.
Figure 2:
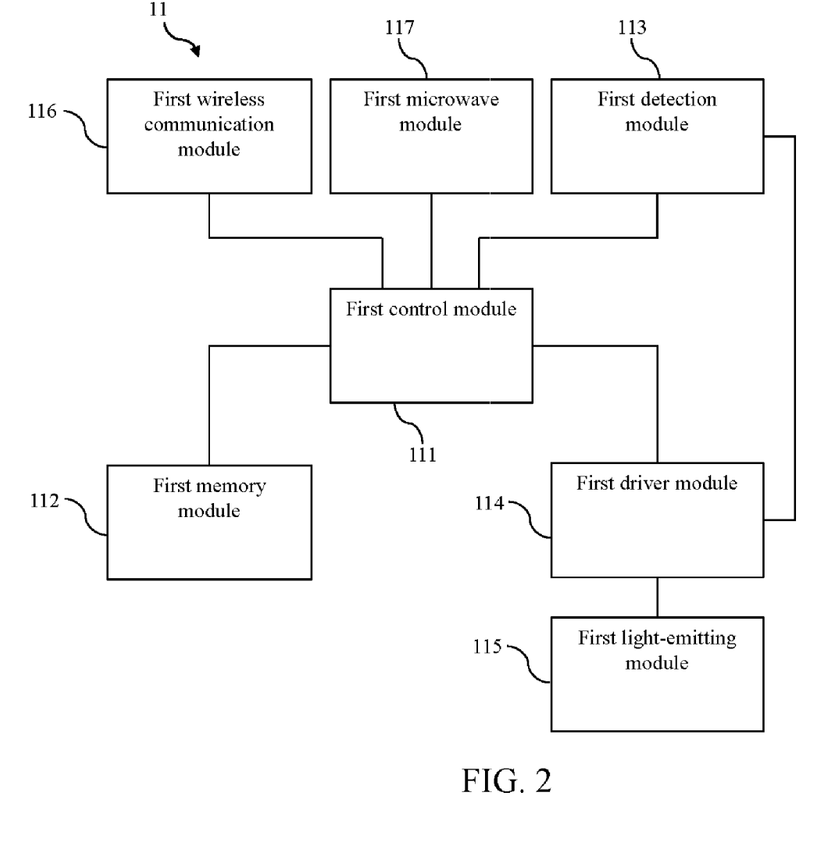
FIG. 2 is a block diagram of a first light source of the lighting system having multiple light sources in accordance with one embodiment of the present invention.
Figure 3:
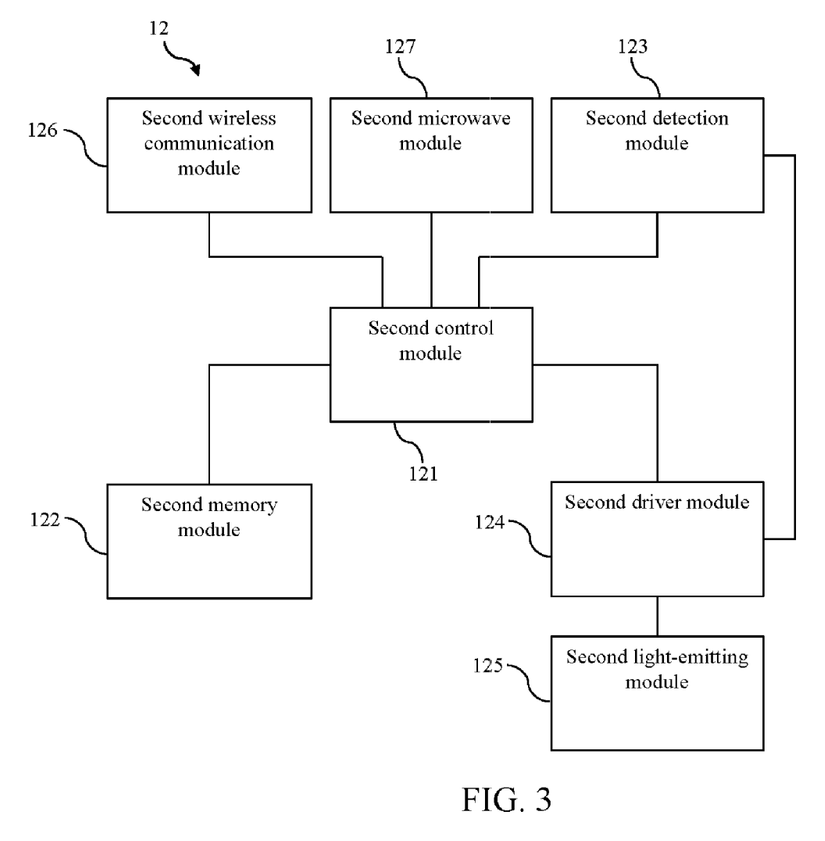
FIG. 3 is a block diagram of a second light source of the lighting system having multiple light sources in accordance with one embodiment of the present invention.

Please refer to FIG. 1, FIG. 2 and FIG. 3. FIG. 1 is a block diagram of a lighting system having multiple light sources in accordance with one embodiment of the present invention. FIG. 2 is a block diagram of a first light source of the lighting system having multiple light sources in accordance with one embodiment of the present invention. FIG. 3 is a block diagram of a second light source of the lighting system having multiple light sources in accordance with one embodiment of the present invention. As shown in FIG. 1, the lighting system 1 having multiple light sources includes a first light source 11 and a second light source 12. The first light source 11 may serve as the main light source and the second light source 12 may serve as a spare light source. In the embodiment, the lighting system 1 is a lighting device having two light sources. In another embodiment, the first light source 11 may be a lighting device and the second light source 12 may be another lighting device.

As shown in FIG. 2, the first light source 11 includes a first control module 111, a first memory module 112, a first detection module 113, a first driver module 114, a first light-emitting module 115, a first wireless communication module 116 and a first microwave module 117. The first control module 111 is connected to the first memory module 112, the first detection module 113, the first driver module 114, the first wireless communication module 116 and the first microwave module 117. The first driver module 114 is connected to the first light-emitting module 115. In one embodiment, the first control module 111 may be a microcontroller (MCU), a central processing unit (CPU) or other similar components. In one embodiment, the first memory module 112 may be an electrically-erasable programmable read-only memory (EEPROM), a flash memory or other similar components. In one embodiment, the first detection module 113 may be various sensors/detectors capable of detecting voltage and/or current signals. In one embodiment, the first wireless communication module 116 may be a Bluetooth communication module, a ZigBee communication module or other similar components. In one embodiment, the first light-emitting module 115 may be a light-emitting diode (LED), a gas discharge lamp or other similar components. The first driver module 114 may be a driver matching the first light-emitting module 115 and able to drive the first driver module 114. In one embodiment, the first microwave module 117 may be a microwave radar sensor or other similar components. The first microwave module 117 can detect whether an object enters the detecting range thereof, such that the first control module 111 can perform the corresponding operation.

The circuit structure of the second light source 12 may be the same with that of the first light source 11. As shown in FIG. 3, the second light source 12 includes a second control module 121, a second memory module 122, a second detection module 123, a second driver module 124, a second light-emitting module 125, a second wireless communication module 126 and a second microwave module 127. The second control module 121 is connected to the second memory module 122, the second detection module 123, the second driver module 124, the second wireless communication module 126 and the second microwave module 127. The functions of the above elements of the second light source 12 are the same with those of the elements of the first light source 11, so will not be described herein. The first control module 111 and the second control module 121 can communicate with each other via the first wireless communication module 116 and the second wireless communication module 126.

The first light source 11 is connected to the main mechanical switch; besides, the first light source 11 is also connected to the second light source 12. The main mechanical switch is connected to a power source P (power grid). When the main mechanical switch is turned on, the first control module 111 turns off the electronic switch configured to control the first light-emitting module 115 and transmits a control signal to the second control module 121. Then, the second control module 121 turns off the electronic switch configured to control the second light-emitting module 125.

The first control module 111 reads the data of the first memory module 112 in order to determine whether the first light source 11 malfunctions. When the first control module 111 determines that the first light source 11 does not malfunction, the first control module 111 turns on the first light-emitting module 115 via the first driver module 114 and transmits a control signal to the second control module 121. In the meanwhile, the second control module 121 turns off the auxiliary mechanical switch thereof connected to the power source P so as to completely turn off the second light source 12.

Afterward, the first detection module 113 keeps detecting whether the first light source 11 malfunctions. The first detection module 113 can sample the voltage/current signals of the first light source 11 in order to detect whether any one of the faults of overheating, flickering, short circuit and open circuit in the first light source 11 occurs.

However, when the first control module 111 reads the data of the first memory module 112 and finds out the malfunctioning record, the first control module 111 transmits a turn-on signal to the second control module 121. Then, the second control module 121 turns on the second light-emitting module 125 (the auxiliary mechanical switch and the electronic switch configured to control the second light-emitting module 125 are simultaneously turned on). Thus, the lighting system 1 having multiple light sources can still operate normally.

When the first detection module 113 detects that the first light source 11 malfunctions, the first control module 111 turns off the first light source 11 (the electronic switch, configured to control the first light-emitting module 115, is turned off). Meanwhile, the first detection module 113 transmits a first fault signal to the second control module 121 and saves the first fault signal in the first memory module 112. Afterward, when the second control module 121 receives the first fault signal, the second control module 121 turns on the second light-emitting module 125 (the auxiliary mechanical switch and the electronic switch, configured to control the second light-emitting module 125, are turned on at the same time) and saves the first fault signal in the second memory module 122, such that the lighting system 1 having multiple light sources can still operate normally.

Similarly, when the second light source 12 is turned on, the second detection module 123 also keeps detecting whether the second light source 12 malfunctions. The second detection module 123 can sample the voltage/current signals of the second light source 12 in order to detect whether any one of the faults of overheating, flickering, short circuit and open circuit in the second light source 12 occurs.

The second control module 121 turns off the second light source 12 (the electronic switch, configured to control the second light-emitting module 125, is turned off, or the above electronic switch and the auxiliary mechanical switch are turned off at the same time) and saves a second fault signal in the second memory module 122.

However, if the first detection module 113 detects that the first light source 11 malfunctions, the first light source 11 may be seriously damaged and cannot transmits any signals. In this case, if the second control module 121 detects that the first light source 11 malfunctions and fails to receive the first fault signal transmitted by the first control module 111, the second control module 121 can directly turn on the second light-emitting module 125 of the second light source 12 (when the first detection module 113 detects that the first light source 11 malfunctions, the first control module 111 can turn on the auxiliary mechanical switch first via the communication function), such that the lighting system 1 having multiple light sources can still operate normally.

As set forth above, the lighting system 1 having multiple light sources has the first light source 11 and the second light source 12 to serve as the main light source and the spare light source respectively, so the lighting system 1 can turn on the second light source 12 when the first light source 11 malfunctions. Therefore, the lighting system 1 can be always in normal operation status, which is more convenient in use.

Besides, the first light source 11 and the second light source 12 of the lighting system 1 can communicate with each other, and the lighting system 1 can further provide a special switching mechanism and a special error detection mechanism. Thus, the lighting system 1 can precisely detect that the first light source 11 malfunctions and turn on the second light source 12 on time, which can enhance the reliability of the lighting system 1.

Moreover, the lighting system 1 having multiple light sources can directly turn on the second light source 12 via a special activation mechanism when the first light source 11 is seriously damaged and cannot transmit any signals. Therefore, the lighting system 1 can make sure that the second light source 12 can be normally turned on when the first light source 11 malfunctions, which can further enhance the reliability of the lighting system 1.

Figure 4:
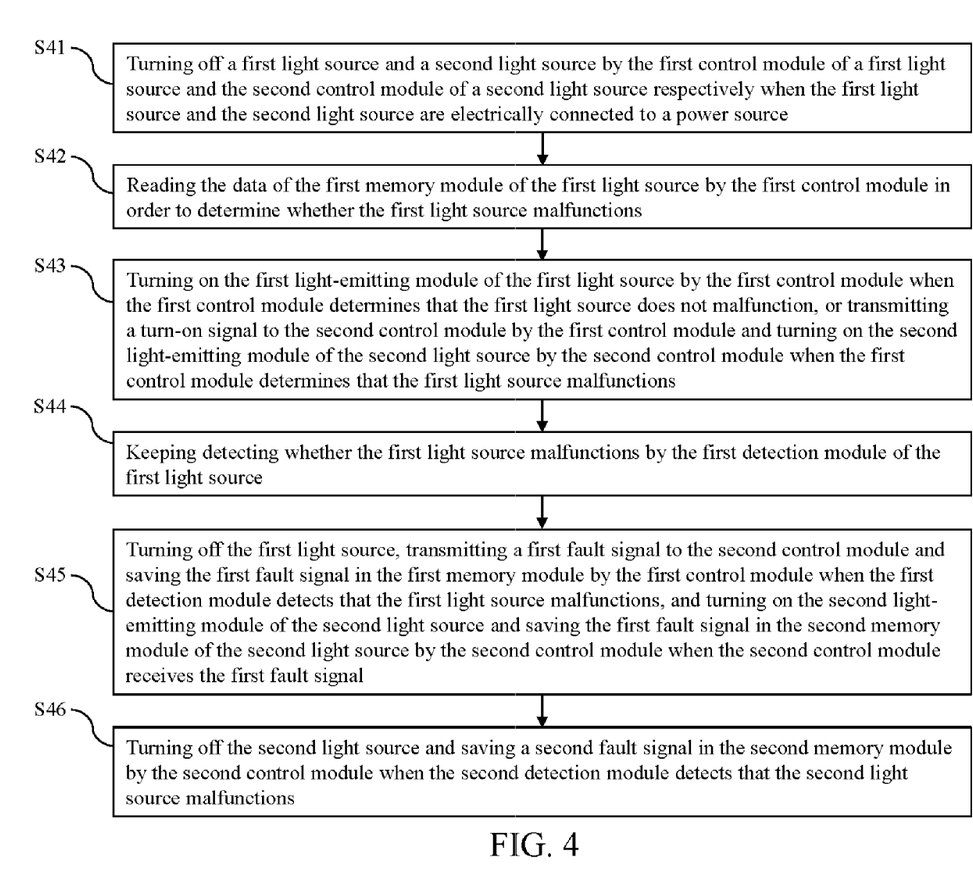
FIG. 4 is a flow chart of a control method for the lighting system having multiple light sources in accordance with one embodiment of the present invention.

Please refer to FIG. 4, which is a flow chart of a control method for the lighting system having multiple light sources in accordance with one embodiment of the present invention. As shown in FIG. 4, the control method of the lighting system having multiple light sources in accordance with the embodiment of the present invention includes the following steps:

Step S41: turning off a first light source and a second light source by the first control module of a first light source and the second control module of a second light source respectively when the first light source and the second light source are electrically connected to a power source.

Step S42: reading the data of the first memory module of the first light source by the first control module in order to determine whether the first light source malfunctions.

Step S43: turning on the first light-emitting module of the first light source by the first control module when the first control module determines that the first light source does not malfunction, or transmitting a turn-on signal to the second control module by the first control module and turning on the second light-emitting module of the second light source by the second control module when the first control module determines that the first light source malfunctions.

Step S44: keeping detecting whether the first light source malfunctions by the first detection module of the first light source.

Step S45: turning off the first light source, transmitting a first fault signal to the second control module and saving the first fault signal in the first memory module by the first control module when the first detection module detects that the first light source malfunctions, and turning on the second light-emitting module of the second light source and saving the first fault signal in the second memory module of the second light source by the second control module when the second control module receives the first fault signal.

Step S46: turning off the second light source and saving a second fault signal in the second memory module by the second control module when the second detection module detects that the second light source malfunctions.

The embodiment just exemplifies the present invention and is not intended to limit the scope of the present invention; any equivalent modification and variation according to the spirit of the present invention is to be also included within the scope of the following claims and their equivalents.

Figure 5A:
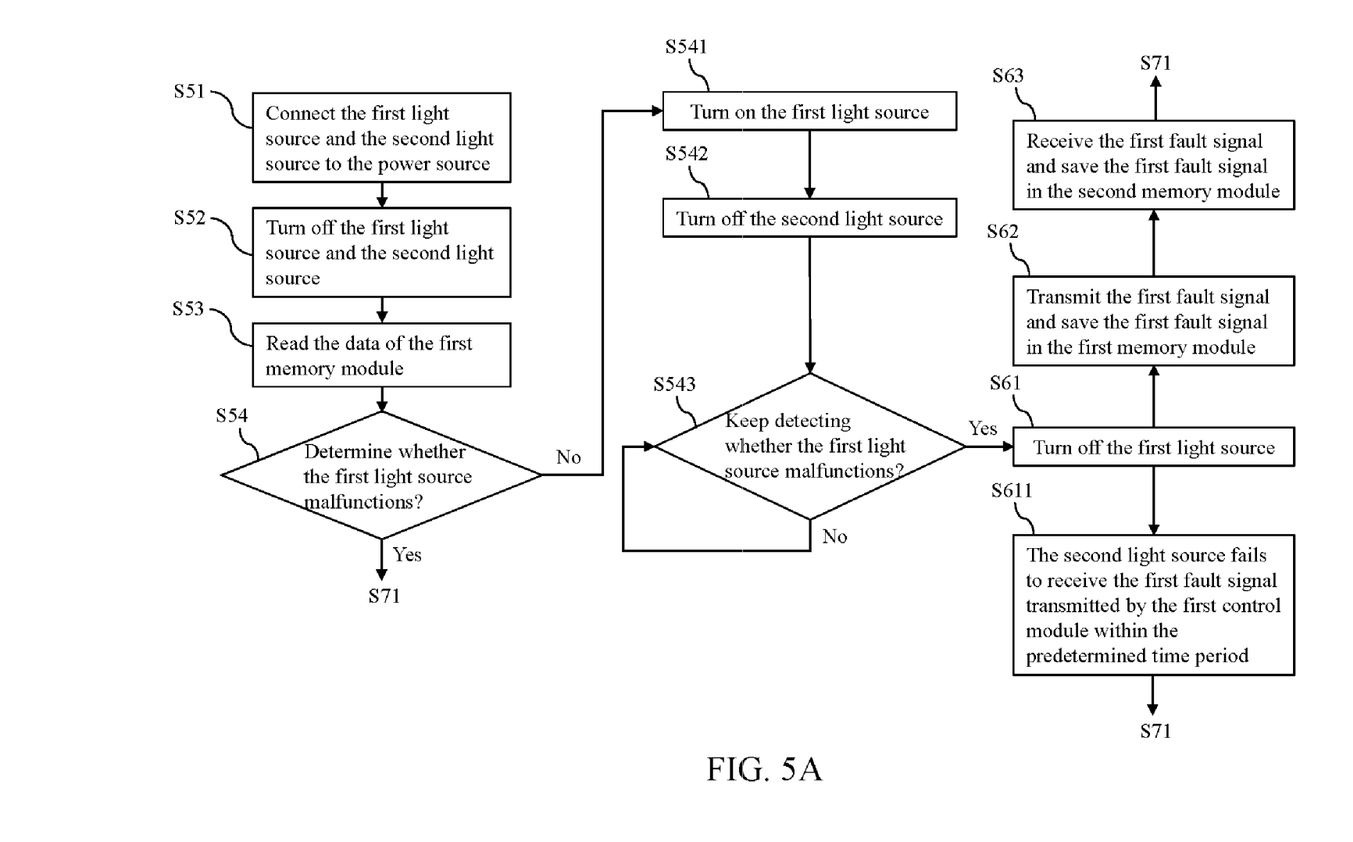
FIG. 5A is a first flow chart of a control method for a lighting system having multiple light sources in accordance with another embodiment of the present invention.
Figure 5B:
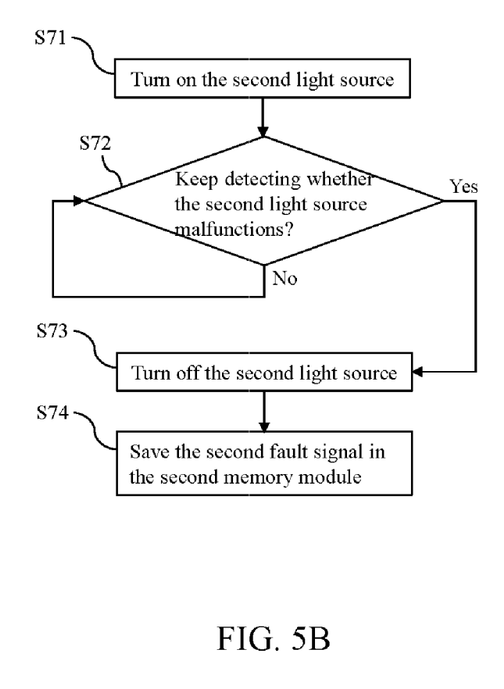
FIG. 5B is a second flow chart of the control method for the lighting system having multiple light sources in accordance with another embodiment of the present invention.

Please refer to FIG. 5A and FIG. 5B, which are a first flow chart and a second flow chart of a control method for a lighting system having multiple light sources in accordance with another embodiment of the present invention. This embodiment illustrates each of the steps of the control method, as follows:

Step S51: connect the first light source and the second light source to the power source; then, the process proceeds to Step S52.

Step S52: turn off the first light source and the second light source; then, the process proceeds to Step S53. In this step, the first control module of the first light source turns off the electronic switch configured to control the first light-emitting module thereof and transmits the control signal to the second control module of the second light source.

Step S53: read the data of the first memory module; then, the process proceeds to Step S54. In this step, the first control module reads the data of the first memory module of the first light source.

Step S54: determine whether the first light source malfunctions? If it does, the process proceeds to Step S71; if it does not, the process proceeds to Step S541. In this step, the first control module determines whether the first light source malfunctions according to the data of the first memory module.

Step S541: turn on the first light source; then, the process proceeds to Step S542. In this step, the first control module turns on the first light-emitting module via the first driver module of the first light source.

Step S542: turn off the second light source; then, the process proceeds to Step S543. In this step, the first control module transmits the control signal to the second control module and then the second control module turns off the auxiliary mechanical switch thereof connected to the power source so as to completely turn off the second light source.

Step S543: keep detecting whether the first light source malfunctions? If it does, the process proceeds to Step S61; if it does not, the step is continuously repeated. In this step, the first detection module can sample the voltage/current signals of the first light source by the predetermined frequency in order to detect whether the first light source malfunctions.

Step S61: turn off the first light source; then, the process proceeds to Step S611 or Step S62. In this step, the first control module turns off the first light source (the electronic switch, configured to control the first light-emitting module, is turned off).

Step S611: the second light source fails to receive the first fault signal transmitted by the first control module within the predetermined time period; then, the process proceeds to Step S71. In this step, the first detection module detects that the first light source malfunctions and the first light source cannot transmits any signals because of serious damage. Besides, the second control module detects that the first light source malfunctions and fails to receive the first fault signal transmitted by the first control module within the predetermined time period (e.g., 5 seconds). This predetermined time period can be adjusted according to actual requirements.

Step S62: transmit the first fault signal and save the first fault signal in the first memory module; then, the process proceeds to Step S63. In this step, the first control module transmits the first fault signal to the second control module and saves the first fault signal in the first memory module.

Step S63: receive the first fault signal and save the first fault signal in the second memory module; then, the process proceeds to Step S71. In this step, the first control module transmits the first fault signal to the second control module and the second control module saves the first fault signal in the second memory module thereof.

Step S71: turn on the second light source; then, the process proceeds to Step S72. In this step, the second control module turns on the second light-emitting module thereof when receiving the first fault signal (the auxiliary mechanical switch and the electronic switch, configured to control the second light-emitting module, are turned on at the same time). In this way, the lighting system having multiple light sources can operate normally.

Step S72: keep detecting whether the second light source malfunctions? If it does, the process proceeds to Step S73; if it does not, the step is continuously repeated. In this step, the second detection module can sample the voltage/current signals of the second light source by the predetermined frequency in order to detect whether the second light source malfunctions.

Step S73: turn off the second light source; then, the process proceeds to Step S74. In this step, the second control module turns of the second light source (the electronic switch, configured to control the second light-emitting module, is turned off, or the above electronic switch and the auxiliary mechanical switch are turned off at the same time) when the second detection module detects that the second light source malfunctions.

Step S74: save the second fault signal in the second memory module. In this step, the second control module generates the second fault signal and saves the second fault signal in the second memory module of the second light source.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting system having multiple light sources includes a first light source and a second light source; the first light source can serve as a main light source and the second light source can serve as a spare light source. Thus, the lighting system having multiple light sources can turn on the second light source when the first light source malfunctions, such that the lighting system can operate normally even if the first light source malfunctions, which is more convenient in use.

Further, according to one embodiment of the present invention, the first light source and the second light source of the lighting system having multiple light sources can communicate with each other, and the lighting system can further provide a special switching mechanism and a special detection mechanism. Therefore, the lighting system can precisely detect whether the first light source malfunctions and turn on the second light source on time. Accordingly, the lighting system can achieve great reliability.

Moreover, according to one embodiment of the present invention, the lighting system having multiple light sources can directly turn on the second light source via a special activation mechanism when the first light source malfunctions and cannot transmit signals. Thus, the lighting system can make sure that the second light source can be normally turned on when the first light source malfunctions, which can further enhance the reliability of the lighting system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting system having multiple light sources, comprising:
   a first light source, comprising a first control module, a first memory module, a first lighting-emitting module and a first detection module; and
   a second light source, comprising a second control module;
   wherein when the first light source and the second light source are electrically connected to a power source, the first control module and the second control module turn off the first light source and the second light source respectively via a switch, wherein the first control module reads a data of the first memory module of the first light source in order to determine whether the first light source malfunctions, and turns on the first light-emitting module when the first control module determines that the first light source does not malfunction, wherein the first detection module keeps detecting whether the first light source malfunctions after the first light-emitting module is turned on.

2. The lighting system having multiple light sources as claimed in claim 1, wherein the second light source further comprises a second light-emitting module, wherein when the first control module determines that the first light source malfunctions, the first control module transmits a turn-on signal to the second control module, whereby the second control module turns on the second light-emitting module.

3. The lighting system having multiple light sources as claimed in claim 2, wherein the second light source further comprises a second memory module, wherein when the first detection module detects that the first light source malfunctions, the first control module turns off the first light source, and transmits a first fault signal to the second control module and saves the first fault signal in the first memory module, wherein when the second control module receives the first fault signal, the second control module turns on the second light-emitting module and saves the first fault signal in the second memory module.

4. The lighting system having multiple light sources as claimed in claim 3, wherein the second light source further comprises a second detection module, wherein the second detection module keeps detecting whether the second light source malfunctions after the second light-emitting module is turned on, wherein when the second detection module detects that the second light source malfunctions, the second control module turns off the second light source and saves a second fault signal in the second memory.

5. The lighting system having multiple light sources as claimed in claim 2, wherein when the second control module detects that the first light source malfunctions and fails to receives a first fault signal transmitted by the first control module within a predetermined time period, the second control module turns on the second light-emitting module.

6. A control method for a lighting system having multiple light sources, comprising:
   turning off a first light source and a second light source by a first control module of a first light source and a second control module of a second light source respectively via a switch when the first light source and the second light source are electrically connected to a power source;
   reading a data of a first memory module of the first light source by the first control module in order to determine whether the first light source malfunctions;
   turning on a first light-emitting module of the first light source by the first control module when the first control module determines that the first light source does not malfunction; and
   keeping detecting whether the first light source malfunctions by a first detection module of the first light source.

7. The control method for the lighting system having multiple light sources as claimed in claim 6, wherein a step of reading the data of the first memory module of the first light source by the first control module in order to determine whether the first light source malfunctions further comprises:
   transmitting a turn-on signal to the second control module by the first control module and turning on a second light-emitting module of the second light source by the second control module when the first control module determines that the first light source malfunctions.

8. The control method for the lighting system having multiple light sources as claimed in claim 7, further comprises:
   turning off the first light source, transmitting a first fault signal to the second control module and saving the first fault signal in the first memory module by the first control module when the first detection module detects that the first light source malfunctions; and
   turning on the second light-emitting module of the second light source and saving the first fault signal in a second memory module of the second light source by the second control module when the second control module receives the first fault signal.

9. The control method for the lighting system having multiple light sources as claimed in claim 8, further comprises:
   keeping detecting whether the second light source malfunctions by a second detection module of the second light source; and turning off the second light source and saving a second fault signal in the second memory module by the second control module when the second detection module detects that the second light source malfunctions.

10. The control method for the lighting system having multiple light sources as claimed in claim 7, further comprises:

turning on the second light-emitting module of the second light source by the second control module when the second control module detects that the first light source malfunctions and fails to receive a first fault signal transmitted by the first control module within a predetermined time period.

\* \* \* \* \*